(No Model.) 2 Sheets—Sheet 1.

W. S. G. BAKER.
CAR AXLE BOX.

No. 399,467. Patented Mar. 12, 1889.

WITNESSES:
H. C. Newman,
O. S. Newman,

INVENTOR,
WILLIAM S. G. BAKER,
By his Attorneys
Baldwin Davidson & Wight (No Model.) 2 Sheets—Sheet 2.
W. S. G. BAKER.
CAR AXLE BOX.
No. 399,467. Patented Mar. 12, 1889.
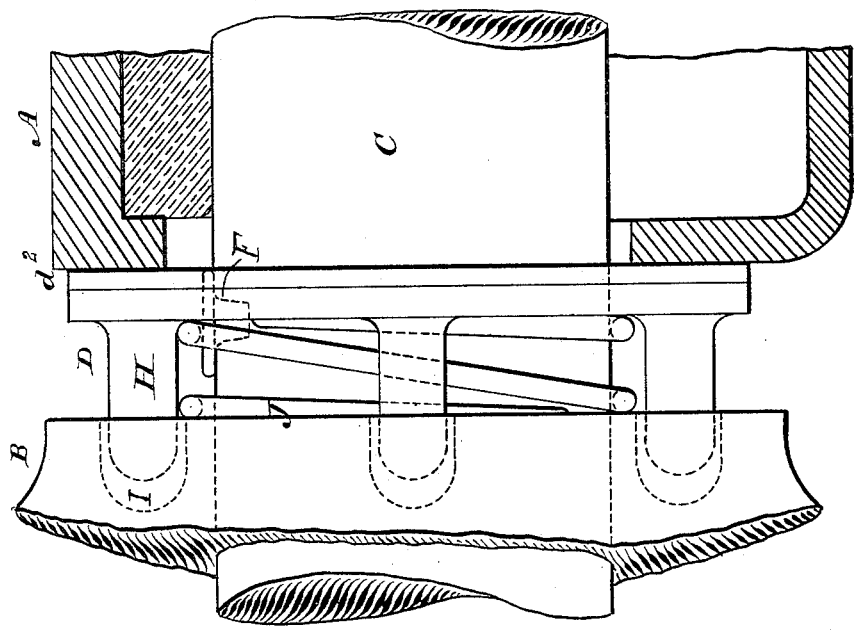
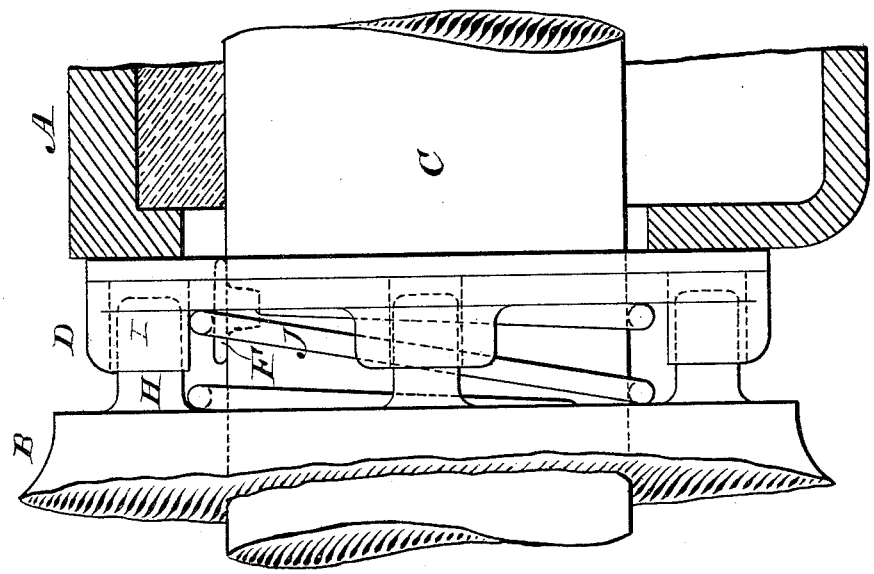
Witnesses  
H. C. Newman,  
E. S. Newman,
Inventor  
WILLIAM S. G. BAKER.  
By his Attorneys  
Baldwin Davidson & Wight

UNITED STATES PATENT OFFICE.

WILLIAM S. G. BAKER, OF BALTIMORE, MARYLAND.

CAR-AXLE BOX.

SPECIFICATION forming part of Letters Patent No. 399,467, dated March 12, 1889.

Application filed June 19, 1888. Serial No. 277,510. (No model.)

*To all whom it may concern:*

Be it known that I, WILLIAM S. G. BAKER, a citizen of the United States, residing at Baltimore city, in the State of Maryland, have invented certain new and useful Improvements in Car-Axle Boxes, of which the following is a specification.

Letters Patent of the United States have heretofore been granted to me for improved dust-guards for car-axle boxes in which a spring-actuated washer is interposed between the rear end of the box and the face of the car-wheel, whereby variations in the relative positions of the box and wheel are compensated by the spring-cushion which always holds the washer in close contact with the box, so as always to exclude dust from the box and retain the oil, thereby preventing undue wear of the journals. An organization of this kind is shown in my patent, No. 247,236, of September 20, 1881. In subsequent patents I have shown spring-actuated dust-guards arranged to revolve with the wheel and axle while maintaining at all times close contact with the end of the axle-box.

The object of my present invention is to provide improved means for connecting the dust-guard to the axle, or to both the axle and wheel, so that the dust-guard, wheel, and axle shall revolve together, and whereby the axle and wheel may have an endwise movement relatively to the dust-guard without withdrawing it from contact with the axle-box.

To this end my invention consists in providing the axle with a tongue or key, which fits in a groove or keyway in the dust-guard in which it is free to move.

It also consists in combining this tongue-and-groove connection of the dust-guard and axle with devices for connecting the dust-guard with the wheel, as will hereinafter be described and claimed.

Figure 1:
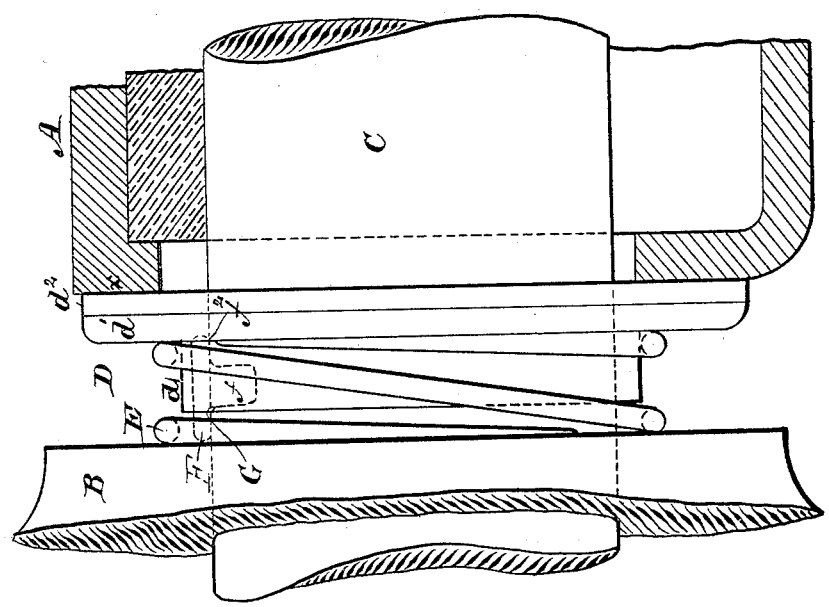
Figure 2:
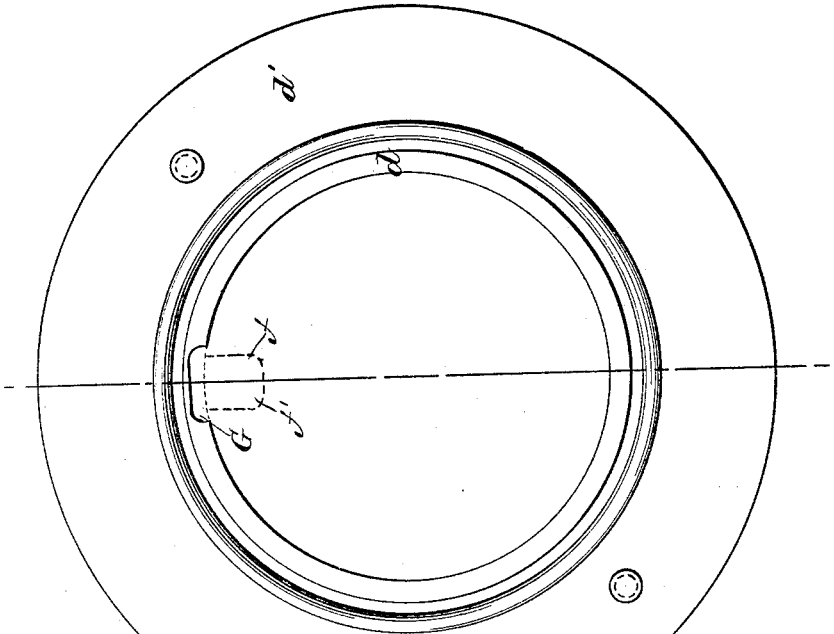

In the accompanying drawings, Figure 1 is a longitudinal central section of so much of an axle-box as is necessary to show the manner of applying my improvements, showing, also, partly in section, part of a car-wheel and my improved dust-guard devices interposed between the wheel and the box. Fig. 2 is a front view of the dust-guard, showing the manner of securing it to the axle. Figs. 3 and 4 are views similar to Fig. 1, showing ways of connecting the dust-guard to both the axle and wheel.

The axle-box A, wheel B, and axle C, as shown in Fig. 1, may be of any usual construction.

The dust-guard D, which is interposed between the wheel and box, is, in this instance, shown as consisting of a metallic sleeve, $d$, fitting closely on the axle and having a flange, $d'$, to the rear of which is secured a washer, $d^2$, preferably formed of vulcanized asbestus fiber. The washer $d^2$ bears at all times against the rear end of the axle-box at $x$. A spring, E, coiled around the axle and around the sleeve $d$, bears against the face of the wheel at one end and at the other against the flange $d'$. I do not limit myself to this construction, as any other arrangement for affording a yielding cushion for the washer may be employed.

To connect the dust-guards to the washer so that they will revolve together, I provide the axle with a tongue or key, F, that fits in a corresponding groove, G, in the sleeve $d$, and is free to slide endwise therein. Preferably this tongue or key is made T-shaped, the stem $f$ fitting in a socket, $f'$, in the axle, and the arms $f^2$ resting on the face of the axle.

This device may be readily applied to any axle-box now in use, as it is only necessary to drill a hole in the axle between the box and the wheel to accommodate the key. When the key is once in place the dust-guard may be readily mounted.

In Fig. 3 I have shown the tongue-and-groove connection of the dust-guard and axle above described, in connection with devices for connecting the dust-guard to the wheel. These devices consist of lugs or dowels H on the car-wheel, which fit in sockets I in the dust-guard, as shown in my patent, No. 276,210, of April 24, 1883. Instead, however, of using several springs, as shown in said patent, I have shown in this instance a single spring, J, coiled around the axle and bearing against the face of the wheel and against the dust-guard.

By the use of devices for connecting the dust-guard both to the wheel and to the axle the dust-guard is held more firmly in position.

In Fig. 4 I have shown the tongue-andgroove connection of the dust-guard and axle in connection with dowels H on the dust-guard, which fit in corresponding sockets, I, in the wheel, as shown in my patent, No. 292,399, of January 22, 1884. In this instance I have shown a single spring, J, coiled around the axle instead of using several springs, as shown in said patent.

All of the devices shown in my patents and in the annexed drawings are efficient in excluding dust from the box and in retaining oil. I prefer, however, the construction shown in Figs. 1 and 2 of the annexed drawings, as such a construction is very simple and acts efficiently.

Having thus described my invention, what I claim as new, and desire to secure by Letters Patent of the United States, is—

1. The combination, substantially as hereinbefore set forth, of the axle-box, the axle, the dust-guard that bears against the axle-box, and the tongue or key on the axle which fits in a groove or keyway in the dust-guard.

2. The combination, substantially as hereinbefore set forth, of the axle-box, the axle, the spring-actuated dust-guard that bears against the axle-box, and the T-shaped tongue or key resting in a socket in the axle, and which fits in a groove or keyway in the dust-guard.

3. The combination, substantially as hereinbefore set forth, of the axle-box, the car-wheel, the axle, the dust-guard that bears against the end of the axle-box, devices for directly connecting the dust-guard to the wheel, and the tongue-and-groove connection between the guard and axle.

In testimony whereof I have hereunto subscribed my name.

WILLIAM S. G. BAKER.

Witnesses:
D. W. POWELL,
CHAS. W. KOHLMANN.